(12) United States Patent
Hall

(10) Patent No.: US 7,214,064 B1
(45) Date of Patent: May 8, 2007

(54) IMPLEMENT FOR SPEECH THERAPY

(76) Inventor: Tracy Hall, 19615 Sandsbury Ct., Land O'Lakes, FL (US) 34639

( * ) Notice: Subject to any disclaimer, the term of this patent is extended or adjusted under 35 U.S.C. 154(b) by 675 days.

(21) Appl. No.: 10/765,977

(22) Filed: Jan. 29, 2004

(51) Int. Cl.
  *G09B 19/00* (2006.01)
(52) U.S. Cl. ..................................... 434/185
(58) Field of Classification Search ............... 434/185; 600/185, 190, 193, 198, 237; 433/6; 482/11; 128/848, 859, 860
See application file for complete search history.

(56) References Cited

U.S. PATENT DOCUMENTS

| | | |
|---|---|---|
| 779,360 A | 1/1905 | Grummann |
| 2,549,398 A | 4/1951 | Stelz |
| 3,401,685 A | 9/1968 | Staub |
| 3,867,770 A | 2/1975 | Davis |
| D267,586 S | 1/1983 | Hatlen |
| 4,718,662 A * | 1/1988 | North ........................... 482/11 |
| 4,997,182 A * | 3/1991 | Kussick ........................ 482/11 |
| 5,052,410 A * | 10/1991 | Stubbs ........................ 128/859 |
| 5,213,553 A | 5/1993 | Light |
| 5,257,930 A | 11/1993 | Blakeley |
| 5,666,973 A * | 9/1997 | Walter ......................... 128/848 |
| 5,779,470 A * | 7/1998 | Kussick .......................... 433/6 |
| D411,623 S * | 6/1999 | Schiavoni .................. D24/193 |
| 6,295,988 B1 * | 10/2001 | Sue .............................. 128/859 |
| 6,632,095 B2 * | 10/2003 | Ryan ........................... 434/185 |
| 6,666,212 B2 * | 12/2003 | Boyd, Sr. ..................... 128/859 |
| 6,837,246 B1 * | 1/2005 | DeLuke ....................... 128/860 |

* cited by examiner

*Primary Examiner*—Kurt Fernstrom
(74) *Attorney, Agent, or Firm*—Dowell & Dowell, P.C.

(57) ABSTRACT

A method and implement for use in speech therapy to assist with teaching a patient to correctly produce sounds, especially /r/ sounds, designed to be used in a human mouth to support tongue tip and made of a palatable, non-toxic substance such as wax or candy.

9 Claims, 2 Drawing Sheets

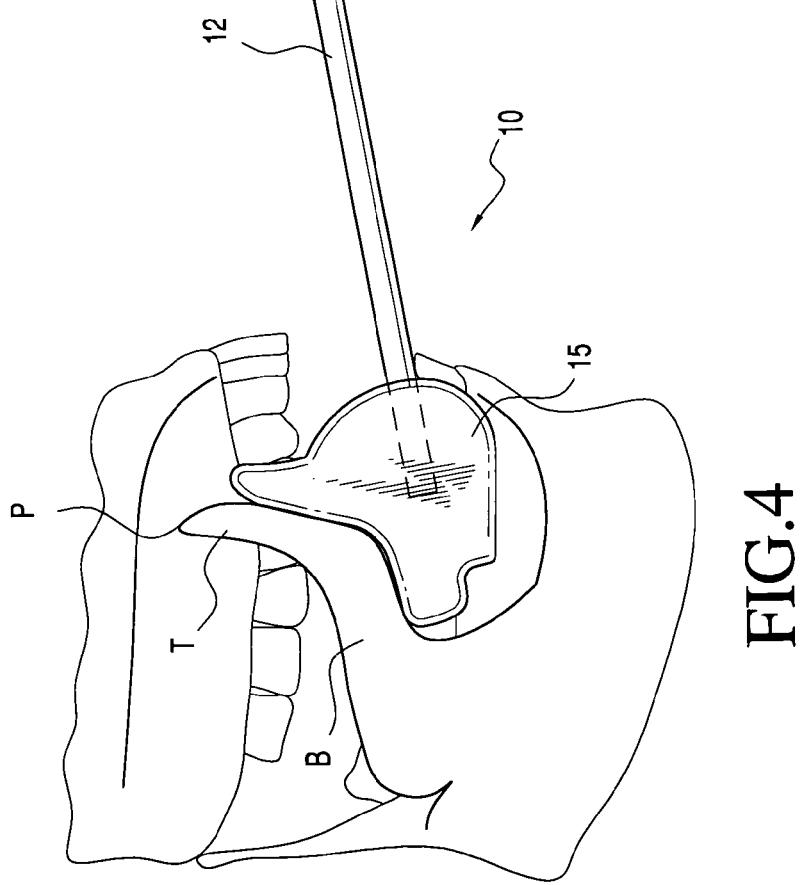
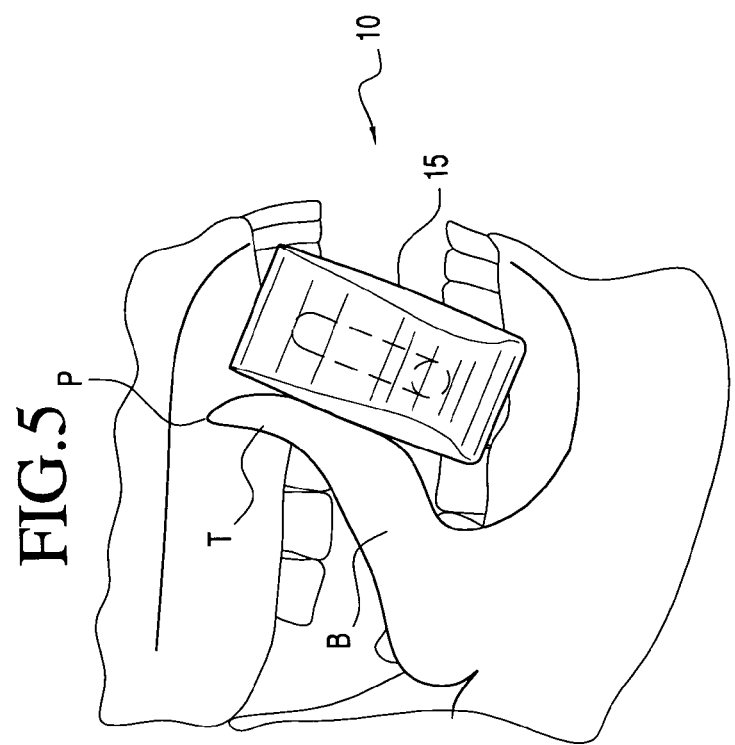

IMPLEMENT FOR SPEECH THERAPY

BACKGROUND OF THE INVENTION

1. Field of the Invention

This invention is generally directed to methods and implements or tools used in speech therapy and more specifically to a method of teaching a patient to correctly produce an /r/ sound and to a tool having a body of a size to be received in the patients oral cavity. The body is defined by multiple curved surfaces which are oriented by a Pathologist for supporting, manipulating and otherwise shaping the patient's tongue in order that the patient properly produces the /r/ sound.

2. Brief Description of the Related Art

Speech production is a complex activity involving many areas of the oral cavity including the lips, cheeks, teeth, and both the soft and hard palates. The muscles and bones of the oral cavity work together to form sounds that help to create recognizable words and phrases. The most important speech producer of the oral cavity is the tongue. Its placement, movement and shaping are instrumental in producing a variety of specific sounds including such difficult sounds as the /r/, /l/, and /n/ sounds.

Articulation patients with speech issues generally demonstrate difficulty with lingual strength, control and manipulation. For many of these articulation patients, most of which are children, the most difficult sound to produce is the /r/ sound. Seemingly, the most difficult part of the /r/ sound remediation for the patient is their inability to get the posterior tongue up and back while properly shaping the rest of the tongue. Speech Language Pathologists spend a great deal of time trying to teach proper /r/ sound production. Exercises and tools, to assist with placement, movement and shaping of the tongue, are available, but none of these adequately assist with the proper positioning and shaping of the tongue. Most therapy for remediation of the /r/ sound focuses on exercises to increase lingual musculature strength, control and coordination. However, this is difficult because of the complicated nature of the tongue's movements for the /r/ sounds.

Lingual positioning for the accurate production of the /r/ sound is also required and is a multi-part operation. Firstly, it requires the posterior portion of the tongue to be positioned superior and posterior in the oral cavity. Secondly, the laterals or sides of the front tongue blade are spread so that they are in contact with the first and possibly the second upper molars. Next, the anterior tongue tip is held medially in the oral cavity. The vertical position of the anterior or tip of the tongue frequently varies from a tip up to tip down and is individual to each patient. The complexity of the steps and the explanation of these steps is frustrating to both the patient and the Pathologist. With the assistance of the articulation tool the Pathologist is able to actively assist the patient with proper placement of the tongue for phonation.

SUMMARY OF THE INVENTION

The articulation tool of the present invention is designed to be used by Pathologist to secure the accurate production of /r/ sounds by supporting and positioning the lingual muscle from the inferior oral cavity. This action increases a patient's ability for control while strengthening and increasing coordination of the tongue.

The tool elevates and shapes the different tongue parts into the correct position for the /r/ sound production in isolation. In isolation refers to the sound being formed alone without words, phrases, etc.

The tongue's relative shaping and positioning are vital to produce proper /r/ sounds and are the most difficult aspect of the production. The articulation tool is used to assist by actively positioning the musculature of the tongue. Since this proper positioning is crucial, the tool would severely limit volitional lingual movement.

The implement includes a body formed of a biocompatible material which is carried by a handle designed to be manipulated by a Speech Pathologist. The body is of a size to be positioned and manipulated within an oral cavity of a child and in some embodiments may be formed or molded from a comestible material such as a candy substance which makes the implement more palatable for use with children and reduces reflex or gag reactions.

The body of the implement has a forward curved projection which is generally convex and configured to engage and elevate a back portion of a tongue. An upper generally concave surface of the body extends rearwardly toward the handle from the forward projection to a rearwardly extending wavepoint or rearwardly oriented projection having a forward generally convex surface portion for engaging and elevating a tongue blade and front portion of the tongue and a rearwardly extending tip for engaging and shaping the tip of the tongue generally centrally of the oral cavity. The concave upper surface of the body permits the tongue to assume a natural curve upwardly within the oral cavity from the back of the tongue toward the tip, which curvature is necessary to create an /r/ sound.

In a preferred embodiment, the lower surface of the implement tapers upwardly from the handle toward the forward projection ending at a somewhat stepped wall which extends upwardly to the forward projection.

It is a primary object of the invention to provide a tool or implement which may be used within an oral cavity in order to support and manipulate a person's tongue in order to teach the proper pronunciation of an /r/ sound.

It is a further object of the invention to provide a tool or implement which is easily manipulated by a Speech Pathologist and which may be used within a person's mouth with minimum gag reflex reactions.

It is also an object of some embodiments of the invention to provide a tool or implement for teaching accurate production of an /r/ sound wherein the tongue engaging body portion of the implement may be forward of an edible material such that the implement may be consumed by a patient as a lollipop or the like.

It is yet a further object of the invention to provide a tool or implement for use by Speech Pathologist in teaching patients to accurately create an /r/ sound wherein the implement may be easily and economically manufactured of disposable and biodegradable materials.

BRIEF DESCRIPTION OF THE DRAWINGS

A better understanding of the invention will be had with reference to the accompanying drawings, wherein:

FIG. 4 is an illustrative view showing the implement of FIG. 1 being used in position within an oral cavity; and FIG. 5 is a further illustrative view showing the implement moved perpendicular to the axis of the patient's tongue.

DESCRIPTION OF THE PREFERRED EMBODIMENTS

Figure 1:
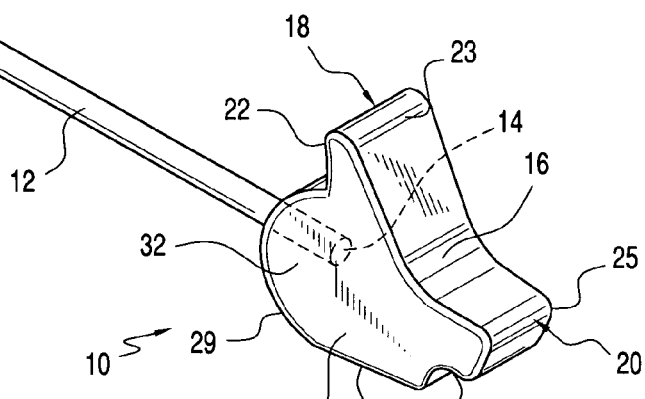
FIG. 1 is a front perspective view of the articulation implement of the present invention.
Figure 2:
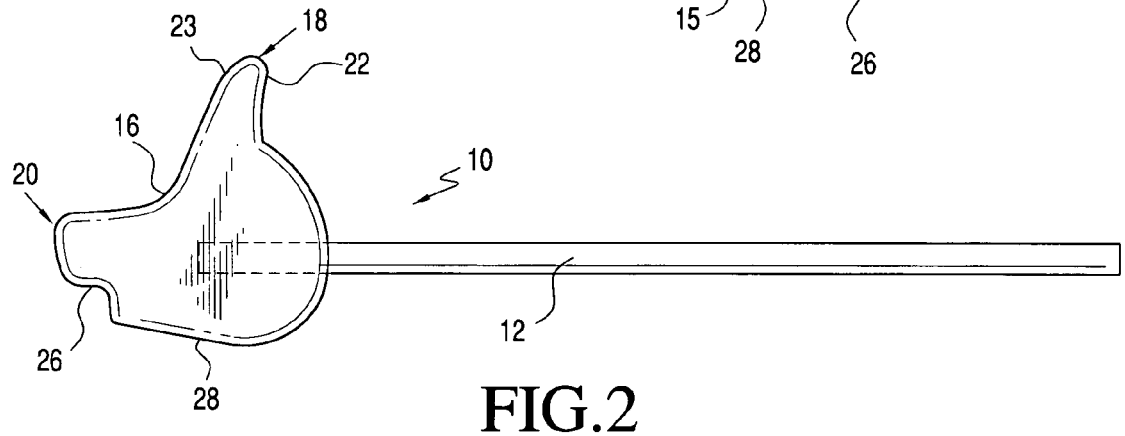
FIG. 2 is a right side view of the implement of FIG. 1.
Figure 3:
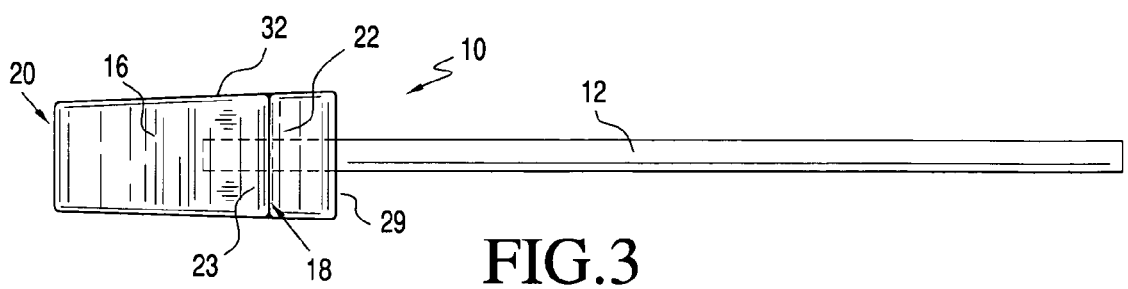
FIG. 3 is a top plan view of the implement of FIG. 1.

The articulation tool or implement 10, as seen in FIGS. 1–3, includes an elongated handle 12 with a free end 13 and a remote end 14. Formed around the remote end is a body 15. The tool or implement may be formed of substantially any sterile and biocompatible material. In the embodiment shown, the handle is formed of a paper or cardboard type material similar to a stick used with conventional lollipops which may include a coating to make the stick somewhat moisture-proof or resistant.

The body of the articulation tool may be made from a variety of materials, however; as the majority of articulation patients are children, the form best suited is an edible or palatable pleasantly flavored item such as candy, either hard or soft, wax, or any nontoxic moldable substance. As the tool or implement may be formed having an edible body 15, the tool or implement may be used by a patient after therapy as a reward in the form of a lollipop, thus making use of the tool or implement by a pathologist less frightening to a child.

The body is preferably formed or molded in a shape or configuration to assist with the production of the /r/ sound. It is designed with multiple tongue "T" engaging surfaces, an upper surface of the body includes a generally central concave portion 16, and first and second projections 18 and 20. Projection 18 is a somewhat wave point configuration consists of a generally rearwardly extending tip 22 and a convex surface 23. The wave point tip 22 is designed to engage and lift the tip "P" of a patient's tongue "T" and to hold the tip "P" along a midline of the oral cavity. The convex surface 23 is engageable with and assists with elevating the tongue blade "B" and tongue tip "P" toward the palate. This convex surface also assists with spreading the laterals or sides of the tongue "T" toward the first and second molars. The second projection 20 includes a generally forwardly directed convex surface 25 extending to a lower surface 28 of the body 15. The second projection is used to elevate the back of the tongue "T" in a posterior direction toward the velum or soft palate. The lower surface 28 of the body is relatively flat and angles upwardly from the rear 29 of the body to meet the front end 26 of the body.

The upper concave surface portion 16 which extends between the front or forwardly extending projection 20 and the wave-like rearwardly extending projection permits a patient's tongue to be cradled when the tip "P" of the tongue "T" is elevated toward the palate to create an /r/ sound.

The body 15 is of a size to be compatible with the patients oral cavity. By way of examples, a prototype implement has a body which is approximately 2.5 cm in length and approximately 3.0 cm in height. The opposite sides 32 of the body may be relatively flat or rounded. The width of the body is approximately 1.5 cm widening to at least approximately 2.0 cm at the wave-like rearward projection 18. The wider support surface at the projection 18 permits more support for the tip "P" portion of the patient's tongue "T". The forward projection may be approximately 1.0 cm in height and approximately 1.5 cm in width. The lower surface 28 levels upwardly toward the front of the body such that the front of the body extends approximately 1.5 cm in height.

Prior to utilizing the articulation tool, the Pathologist instructs the patient as to the particular aspects of the articulation tool including the labeling, shapes, and positions used during the phonation of /r/ sounds in isolation. The articulation tool is used to assist with the production of /r/ sounds with a gradual reduction in its use until such time as the patient can form /r/ sounds consistently without the use of the tool.

While instructions vary with each patient and the particular problems that they face, the general instructions for use include having the patient open their mouth and lift their tongue "T". The articulation tool is inserted in the oral cavity and under the tongue "T" with the wave point projection 18 in an upward direction as shown in FIG. 4. The patient is instructed to phonate the /r/ sound and the patient continues phonation while the Pathologist moves the tool in the oral cavity until such time as the patient correctly produces the /r/ sound.

The Pathologist determines where support is needed and angles the handle appropriately. One example is a patient that needs more support in the posterior region of the oral cavity. The Pathologist angles the handle toward the inferior labials while applying pressure in the posterior direction.

In a patient where the lateral tongue blades "B" require more support, the articulation tool is turned at a right angle from the oral cavity with slight pressure applied superiorly while the Pathologist instructs the patient to spread the laterals or sides of the tongue "T" so that they touch the teeth at or about the first and second molars, see FIG. 5.

When more support is needed anteriorly, at the tongue tip "P", the Pathologist moves the handle to a right angle from the oral cavity and applies slight pressure posteriorly. It is important that with each adjustment the Pathologist instructs the patients in the proper movements to preform as well as explaining what she or he, the Pathologist, is doing, so as not to alarm the patient.

Once correct support is determined for each patient, the Pathologist then instructs the patient to phonate repeatedly to reenforce the muscle memory of the tongue "T". The articulation tool is then removed with subsequent phonation and replaced periodically until such time as the tool is no longer needed to phonate the /r/ sound as determined by the Pathologist.

Once /r/ sound production in isolation is achieved without the use of the articulation tool, additional therapy goals can be attempted such as production of /r/ syllables, words, phrases, sentences, paragraphs, and conversational speech. The final therapy sessions focus on carrying over and maintaining the accurate production of the /r/ sound.

The invention claimed is:

1. A tool to assist with sound production in a human mouth comprising,
    an elongated handle having a free end and a remote end with a body supported by said remote end;
    said body having upper and lower surfaces, said upper surfaces being defined by a forward projection and a rearward projection which are connected by a generally concave central surface portion,
    said rearward projection being in a general form of a wave having a rearwardly extending point and convex surface portion which connects with said central portion, wherein said rearward projection is used to support the tip and blade portions of a person's tongue and the forward projection is used to support a back of the tongue.

2. A tool to assist with sound production in the human mouth as in claim 1 wherein said lower surface tapers upwardly from a rear of said body toward a front of said body.

3. A tool to assist with sound production in the human mouth as in claim 1 wherein said body is comprised of a material selected from a group of materials consisting of an edible candy, wax or nontoxic moldable substance.

4. A tool to assist with sound production in the human mouth as in claim 1 wherein said body widens in thickness dimension adjacent said rearward projection.

5. A tool to assist with sound production in the human mouth as in claim 1 wherein said handle defines an elongated axis, and said rearward projection being spaced from said elongated axis at a distance which is greater than a distance at which said forward projection is spaced from said elongated axis.

6. A method to assist with production of /r/ sounds in the oral cavity using a tool having an elongated handle having a free end and a remote end with a molded body formed around said remote end, the body having a wave-like rearward projection and a forward projection, the method, comprising;

inserting said tool underneath the tongue of a patient so that said wave-like projection supports a patient's tongue's anterior portion superiorly and;

said forward projection supports a posterior portion of the tongue.

7. A method as in claim 6 including angling the handle of the tool is towards the inferior labials while pressure is applied in a posterior direction to give additional lingual support in the posterior region of the tongue.

8. A method as in claim 6 including orienting the handle of the tool at a right angle to the oral cavity while pressure is applied superiorly and;

the laterals of the tongue are spread to touch the patients teeth to give lingual support to the lateral region of the tongue.

9. A method as in claim 6 including orienting the handle of the tool at an angle to the oral cavity while pressure is applied posteriorly to give lingual support at a tip of the tongue.

* * * * *